United States Patent [19]

Fan

[11] 4,312,915
[45] Jan. 26, 1982

[54] CERMET FILM SELECTIVE BLACK ABSORBER

[75] Inventor: John C. C. Fan, Chestnut Hill, Mass.

[73] Assignee: Massachusetts Institute of Technology, Cambridge, Mass.

[21] Appl. No.: 94,370

[22] Filed: Nov. 15, 1979

Related U.S. Application Data

[63] Continuation of Ser. No. 873,434, Jan. 30, 1978, abandoned, which is a continuation-in-part of Ser. No. 624,701, Apr. 7, 1976, abandoned.

[51] Int. Cl.³ .................... B32B 5/16; B32B 15/04; F24J 3/02
[52] U.S. Cl. .................... 428/323; 126/417; 350/1.1; 350/1.6; 350/1.7; 427/160; 427/376.3; 428/328; 428/333; 428/469; 428/472; 428/913
[58] Field of Search .............. 29/195 M; 106/58, 59, 106/66; 126/270, 271, 417; 350/1.1, 1.6, 1.7; 427/34, 160, 162, 376 B, 376.2, 376.3, 376.4, 376.5; 428/212, 215, 469, 472, 913, 216, 323, 328, 332, 333

[56] References Cited

U.S. PATENT DOCUMENTS

| | | | |
|---|---|---|---|
| 2,775,531 | 12/1956 | Montgomery et al. | 428/469 X |
| 3,069,759 | 12/1962 | Grant et al. | 29/182.5 |
| 3,272,986 | 10/1966 | Schmidt | 350/1 |
| 3,990,860 | 11/1976 | Fletcher et al. | 428/472 X |
| 4,006,278 | 2/1977 | Pukaite | 428/472 X |
| 4,010,312 | 3/1977 | Pinch et al. | 428/469 X |
| 4,038,216 | 7/1977 | Henrich et al. | 252/514 |

OTHER PUBLICATIONS

Henrich et al., "High-Efficiency Secondary-Electron Emission from Sputtered MgO-Au Cermets", App. Phys. Let. 23,7 (1973).
Henrich et al., "Effects of Cesiation on Secondary-Electron Emission from MgO/Au Cermets", J. Appl. Phys., 45, 3742 (1974).
Henrich et al., "Differential Sputtering of MgO/Au Cermet Films and its Application to High-Yield Secondary-Electron Emitter", Surface Science, 42 (1974), pp. 139-156.

*Primary Examiner*—Bruce H. Hess
*Attorney, Agent, or Firm*—Arthur A. Smith, Jr.; Martin M. Santa

[57] ABSTRACT

A selective-black absorber capable of operation at elevated temperatures and high efficiency as a solar energy absorber is described. A cermet of MgO/Au, MgO/Pt, and $Cr_2O_3$/Cr having high solar energy absorptance and low infrared energy emissivity is coated on a substrate having high infrared reflectivity such as Mo coated on stainless steel; Ni coated on Cu, or steel; aluminum, or steel. Typically an absorption coefficient of about 0.93 with an emissivity of about 0.09 is obtained and operation at a temperature of 300°–400° C. is possible depending on the cermet and substrate materials.

24 Claims, 9 Drawing Figures

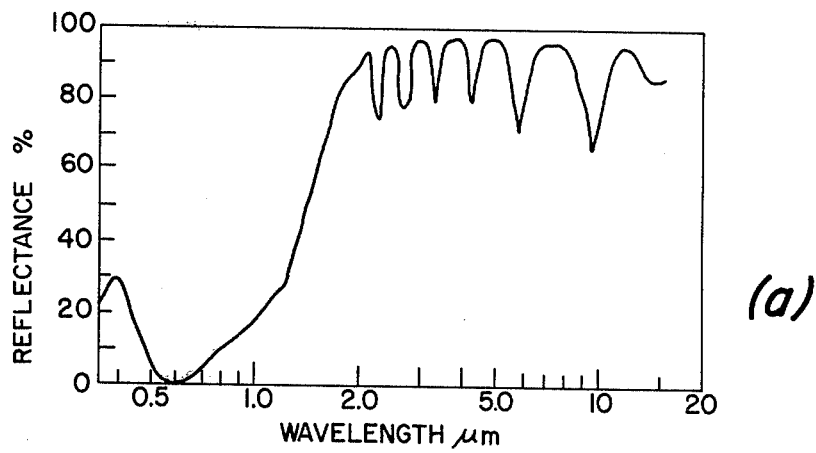
(a)
REFLECTANCE OF AN ABSORBER-REFLECTOR TANDEM IN WHICH THE ABSORBER CONSISTS OF 2 MICROMETERS SILICON ON TOP OF 0.5 MICROMETERS GERMANIUM
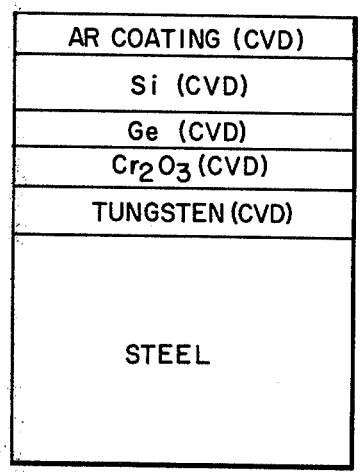
PRIOR ART
(b)
TWO-ABSORBER STACK DEPOSITED ONTO THE STEEL SUBSTRATE ENTIRELY BY CHEMICAL VAPOR DEPOSITION
FIG. 1

CERMET FILM SELECTIVE BLACK ABSORBER

The Government has rights in this invention pursuant to Contract F19(628)-76-C-0002, Electronic Systems Division, Air Force Systems Command, United States Air Force.

This is a continuation of application Ser. No. 873,434 filed Jan. 30, 1978, now abandoned, which was a continuation-in-part of application Ser. No. 624,701 filed Apr. 7, 1976, now abandoned.

Selective-black absorbers can be obtained in three ways. First, a thin film that absorbs solar radiation, but is transparent to infrared radiation, can be coated on a base that has low infrared emissivity. The high infrared reflectivity of the base provides the low infrared emissivity. Second, selective black properties may also be obtained with a metal or metallic oxide that has high infrared reflectivity and a low solar reflectivity that is further suppressed by antireflections coatings. Lastly, wire-mesh techniques to fabricate selective-black surfaces with special morphology to trap the solar radiation but not the infrared.

This invention relates to the first technique for obtaining selective-black absorbers.

BACKGROUND OF THE INVENTION

FIG. 1 shows the most advanced prior-art selective-black absorber fabricated by Seraphin of the University of Arizona. It consists of multilayers of Si and Ge separated from tungsten and steel by a diffusion barrier of $Cr_2O_3$. The Si and Ge, which transmit infrared radiation provide high absorption below 1 μm; the tungsten provides high infrared reflectivity. The Si reflectivity in the solar spectrum is suppressed by an antireflection coating. The optical-reflectivity spectrum of such a composite is shown in FIG. 1(a). The wavelength-selective properties are good but not outstanding. However, an important advantage of these composites is their stability at a high operating temperature, 500° C., for over 1000 hours.

The most popular prior-art selective-black absorber for low temperature operation is Cr-black. Cr-black is presently deposited on metal sheets by electroplating. FIG. 2 shows the optical reflectivities of two Cr-black coatings. One was electroplated on Cu, the other Mar et al. electroplated on Ni. The coating on Cu has excellent selective properties: a solar absorptivity of 94% and an infrared emissivity of 4%. The Cr-black on Ni also has high solar absorptivity, about 94%, but its infrared emissivity is 12%.

Unfortunately, the optical properties of Cr-black on Cu degrade at operating temperatures above 200° C. in air. However, Cr-black on Ni is stable up to 300° C.

The basic properties of Cr-black absorbers are not yet well understood. Initial x-ray diffraction results suggest that the material is a cermet consisting of polycrystalline $Cr_2O_3$ and amorphous or extremely fine-grained Cr metal, in which the front surface is almost entirely $Cr_2O_3$ and the metal concentration increases toward the coating-substrate interface. If this is the case, the optical properties may be affected by crystallization of the amorphous chromium at elevated temperatures. In addition, at 350° C. Cr oxidizes in air to $Cr_2O_3$. To circumvent these problems a cermet system MgO/Au, in which the metal, Au, is not amorphous and does not oxidize; and a $Cr_2O_3$/Cr cermet with antireflective coating have been developed.

THE FIGURES

FIG. 1 is a prior-art multilayer selective black absorber.

It is an object of this invention to provide a selective-black absorber having a long lifetime at elevated temperatures such as found in solar energy applications.

THE INVENTION

MgO/Au cermet films are deposited in this invention by the method of r.f. sputtering used previously for high yield, long life secondary-electron-emitters as described in V. E. Henrich and J. C. C. Fan, Appl. Phys. Lett. 23, 7(1973), and J. C. C. Fan and V. E. Henrich, J. Appl. Phys. 45, 3742 (1974); U.S. Ser. No. 604,390, filed Aug. 13, 1975, now U.S. Pat. No. 4,038,216, assigned to the assignee of this application. In this material system, transmission electron microscopy showed small crystallites of both MgO and Au (usually <200 Å). The small particle sizes and the presence of small metallic particles suggested to the inventor the possible application of MgO/Au as a solar selective black coating. A solar selective black coating should have a high solar absorptivity (α), and a low infrared thermal emissivity (ε). Solar radiation will be absorbed and converted into heat energy by such a coating. Since heat energy is concentrated in the infrared spectrum, a low thermal emissivity will greatly reduce re-radiation losses. In the commercially known Au black smoke process (Au smoke is used as a flat black coating), the Au particles are often very small (<200 Å), and separated by air (refractive index of 1.0)—the Au particles are fluffy and lose the black absorbing properties if pressed. Hence they are not mechanically stable. In the MgO/Au system, the Au particles are also small, but instead of air, they are separated by MgO (refractive index of ~ 1.70) particles. The MgO particles effectively lock in the Au particles, and hence such a coating will be mechanically stable. Why MgO/Au films are highly absorbing may be due to the various reasons. Two of the possible reasons are that Au absorbs reasonably well in the visible spectrum (a 200 Å film has 40% absorptance at 0.5 μm wavelength), and the many small Au particles in such a MgO/Au film will greatly enhance the visible absorption due to multiple reflection. In the infrared spectrum, Au has very low absorption, and thus multiple reflections do not significantly increase the infrared absorption. Also, that Maxwell-Garnet theory states that if $d/\lambda \ll 1$ where d=diameter of metallic particle and λ=wavelength, the metallic particles behave like Lorentz oscillators, with resonant absorption in the visible spectrum for certain particle sizes, and low absorption in the infrared.

Regardless of which reason is correct, a MgO/Au film should have high absorption in the visible and low absorption in the infrared, and this is indeed verified for the measured optical properties of a 1500 Å MgO/Au film deposited on a transparent BaF$_2$ substrate.

Figure 2:
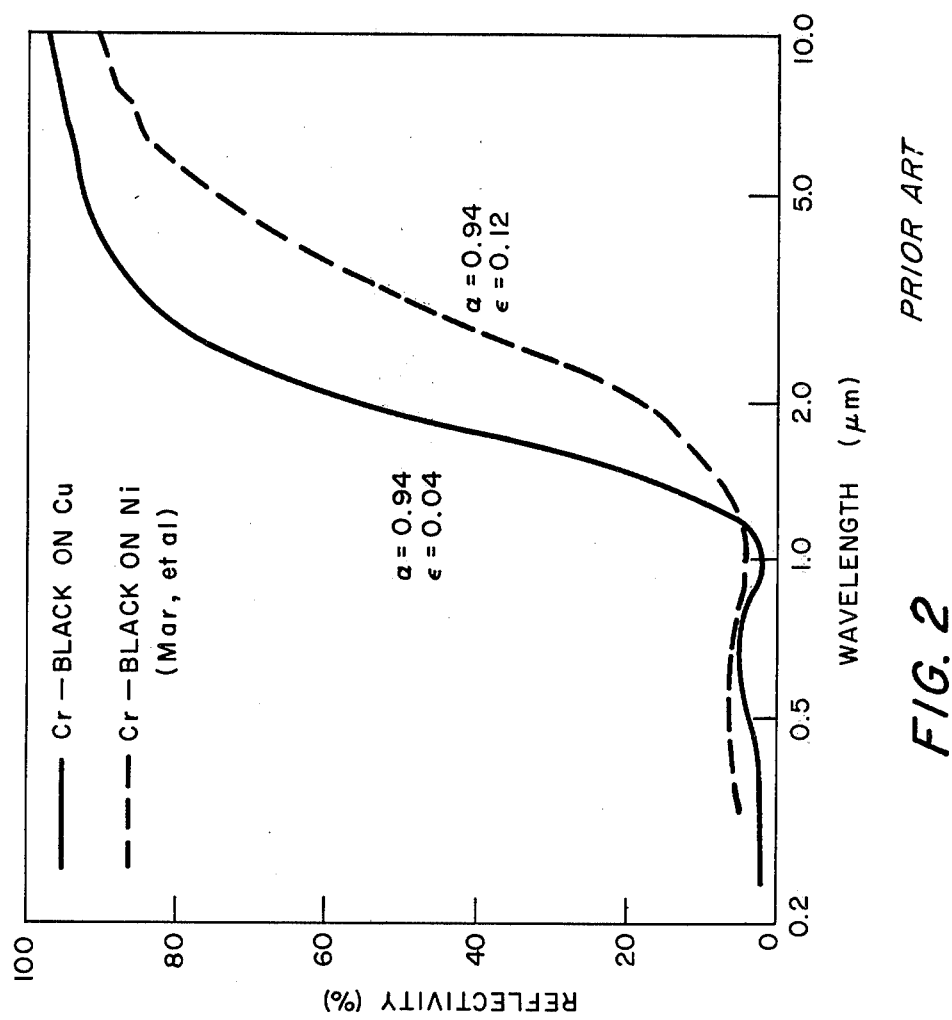
FIG. 2 is another embodiment of a prior-art selective black absorber.
Figure 3:
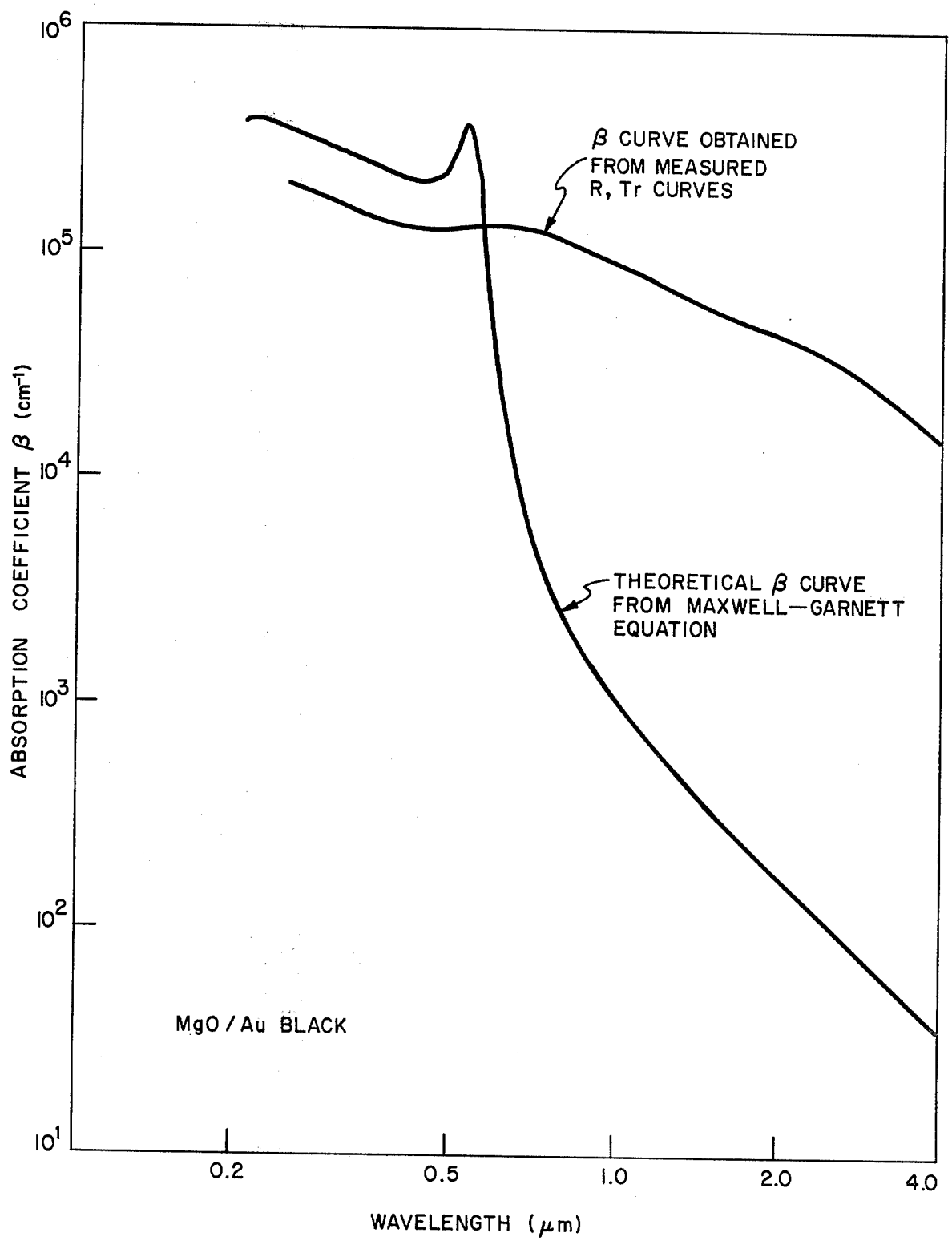
FIG. 3 is a plot of the absorption coefficient versus wavelength for an MgO/Au film.

FIG. 3 shows the absorption coefficient versus wavelength for an MgO/Au film. This curve was obtained from measured reflectivity and transmission spectra. On passing from visible to infrared wavelengths, the absorption coefficient decreases. With the film thickness used, the cermet is essentially transparent in the infrared, and the low infrared emissivity of the MgO/Au absorber is provided by the low infrared emissivity of its substrate. Moreover the solar absorption coefficient is high, and the film absorbs essentially all the solar radiation. These experiments suggest that Cr-blacks most probably have similar optical properties.

Therefore, if a MgO/Au cermet film is coated on a metallic substrate (such as copper), the high infrared reflectivity of copper will not be significantly affected by an overcoat of this MgO/Au film. We then have a high infrared reflectivity (low infrared emissivity), and high solar absorption—an excellent selective black absorber.

Figure 4:
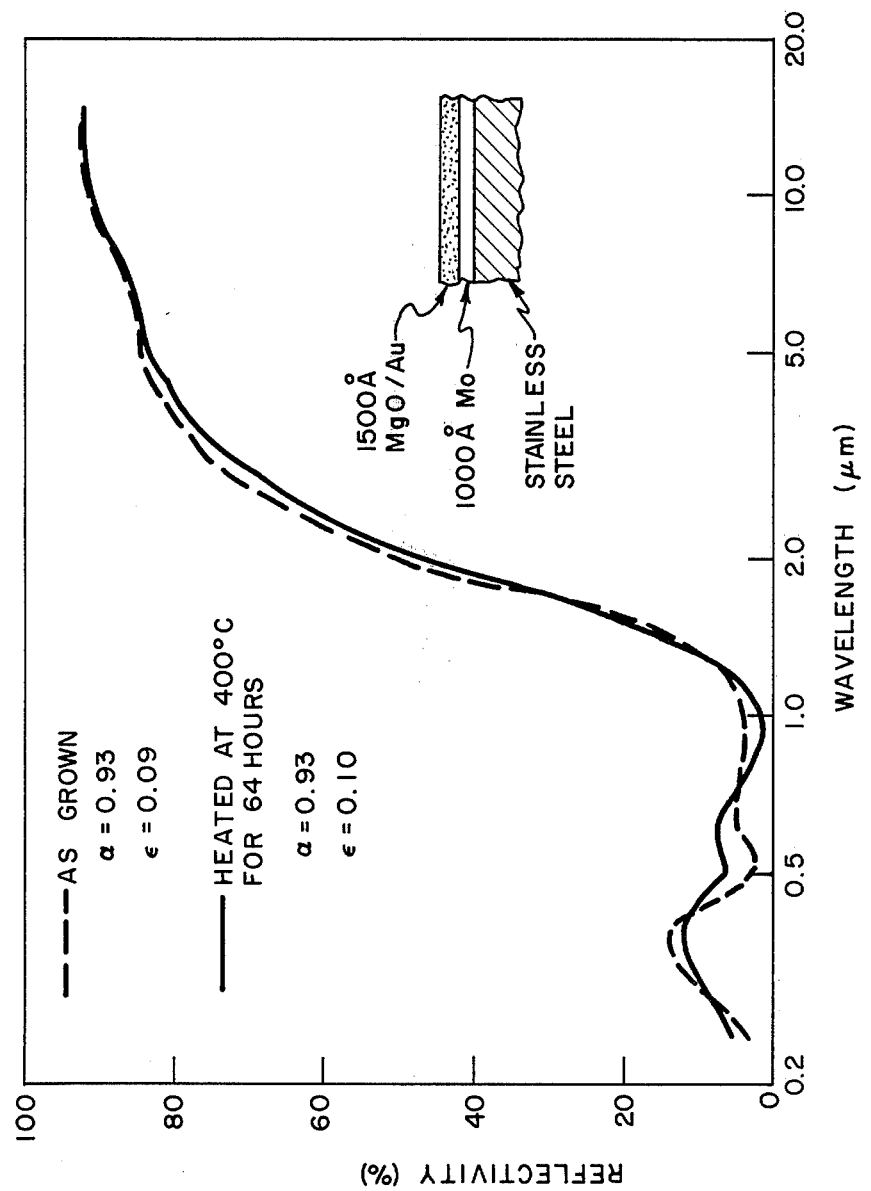
FIG. 4 shows a cross-sectional view of a preferred embodiment of this invention and its reflectivity as a function of wavelength.

MgO/Au cermet films deposited by rf sputtering on metallic substrates are excellent selective-black absorbers. FIG. 4 shows the optical reflectivity of a 1500 Å-thick MgO/Au film (75 vol. % MgO and 25 vol. % Au) coated on a substrate of Mo on stainless steel. The as-grown surface has a solar absorptivity of 93% and an infrared emissivity of 9%. After this absorber was heated in air at 400° C. for 64 hours, the emissivity and solar absorptivity were essentially the same, indicating that such an absorber is quite stable at 400° C. At 500° C., the MgO/Au absorber begins to degrade. In particular, the solar absorptivity decreases, while the infrared reflectivity does not change. Examination of degraded films with a scanning electron microscope indicates that degradation takes place by crack formation and subsequent surface aggregation. A better match between thermal expansion coefficients of different layers may stop the degradation at 500° C.

There have also been fabricated such a selective-black, composed of MgO/Au (about 1500 Å thick of 75 vol % MgO and 25 vol % Au) on copper, steel, aluminum, and nickel substrates. The relevant optical properties are measured by Gier-Dunkl solar reflectometer and infrared reflectometer in the Laboratory. In the solar reflectometer, the apparatus measures the solar reflectivity $R_s$ (solar absorptivity $\alpha_s = 1 - R_s$) weighed to air mass of zero. The Gier-Dunkl infrared reflectometer measures the infrared reflectivity $R_{ir}$ (infrared emissivity $\epsilon_{ir} = 1 - R_{1r}$) weighted to room temperature radiation which peaks at 10 m.

Table 1 summarizes the results on some MgO/Au selective black absorbing coating that have been made.

TABLE I

| Thickness of MgO/Au | Substrate Material | $\alpha_s$ | $\epsilon_{ir}$ | Temp. of Annealing in Air Stable At Least Up to | Time of Annealing |
|---|---|---|---|---|---|
| 1600Å | 1000Å Ni coated on Cu | .92 | .05 | 300° C. | 5 hours |
| 1600Å | 1000Å Ni coated on steel | .92 | .12 | 400° C. | 5 hours |
| 1600Å | Steel | .91 | .12 | 400° C. | 40 hours |
| 1600Å | Al | .91 | .06 | 300° C. | 70 hours |
| 1500Å | 1000Å Mo coated on stainless steel | .93 | .09 | 400° C. | 64 hours |

The thickness and the composition of the MgO/Au cermet film are interrelated and they are chosen so that the solar absorption will be high while it is transmissive to infrared radiation. While the invention has been described in the preferred embodiment as an MgO/Au film, other cermet films such as MgO/Pt also function satisfactorily. The platinum grains are also less than 200 Å with approximately the same volume percent as for gold. In general, the metal constituent of the cermet should be oxidation resistant at elevated temperatures.

Selective absorbers prepared with Cr$_2$O$_3$/Cr cermet films deposited by rf sputtering have properties quite similar to those obtained with electroplated Cr-black coatings.

For convenient control of composition, the Cr$_2$O$_3$/Cr films were prepared by simultaneous rf sputtering of two hot-pressed targets, one of Cr$_2$O$_3$ and the other of Cr. The substrates were placed on a stainless-steel water-cooled platform that was rotated at 10 rpm so that each substrate alternately intercepted the species arriving from the two targets. Therefore, the film composition could be adjusted by changing the sputtering rates of the targets, which had been determined as a function of target voltage in individual calibration experiments. The deposition rate of Cr$_2$O$_3$ was kept constant at 14.5 Å/min, and the Cr deposition rate was changed to give films with Cr concentrations of 0, 11, 21, 29, and 35 vol%. The uncertainty in these values is estimated to be 1%. The substrate rotation speed and the deposition rates were such that the films consist of an intimate mixture of Cr$_2$O$_3$ and Cr, rather than discrete layers of the two constituents. Transmission-electron microscope studies of specimens deposited on carbon substrates (carbon films 150 Å thick deposited on 200-mesh copper grid) have shown that the films consist of individual Cr$_2$O$_3$ and Cr crystallites ranging in size up to about 150 Å.

In order to determine the optical constants of the Cr$_2$O$_3$/Cr films, reflectivity and transmission measurements were made as a function of wavelength on specimens that had been deposited on single-crystal BaF$_2$ substrates. Values of the refractive index n and extinction coefficient k were obtained by fitting the data to expressions giving the reflectivity and transmission in terms of complex dielectric constants.

Figure 5:
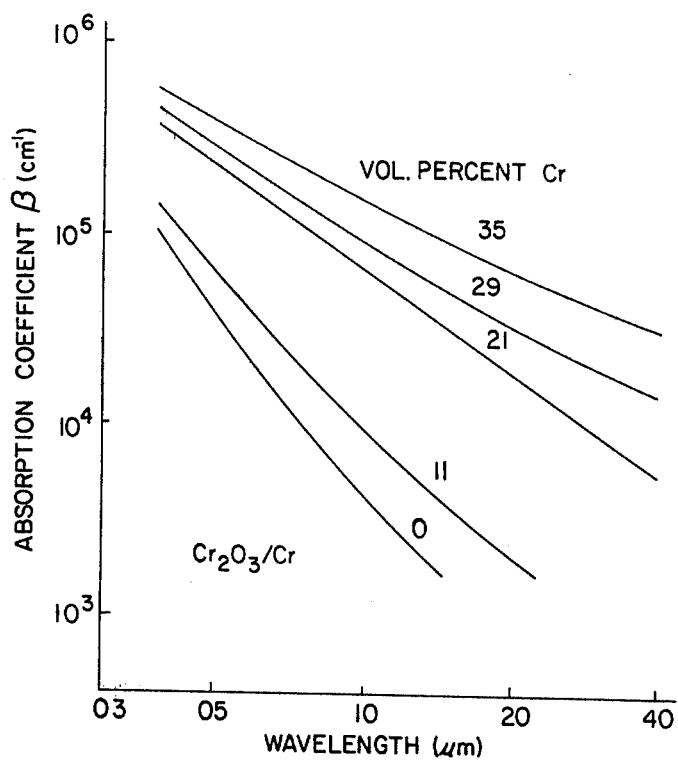
FIG. 5 shows the wavelength dependence of absorption coefficient β calculated for $Cr_2O_3$/Cr cermet film with different concentrations of Cr.

The wavelength dependence of the absorption coefficient $\beta$, which was calculated from k by using the expression $\beta = 4\pi k/\lambda$, is shown in FIG. 5. For wavelengths $\lambda$ longer than about 1 $\mu$m, n increases monotonically with increasing Cr content, but at shorter wavelengths the variation is more complex. The value of $\beta$ increases monotonically with Cr content over the whole wavelength range.

On the basis of the optical constants determined for the Cr$_2$O$_3$/Cr films, it was apparent that good selective black properties could be obtained by deposition of such films on substrates with low infrared emissivity, such as metallic substrates. Computer calculations using these constants indicated that the optimum film thickness would be less than 0.1 μm and showed that of the various compositions investigated 29 vol% would be closest to the optimum. According to these calculations, films with this composition would have reflectivity over 20% in the visible spectrum, causing a marked reduction in their solar absorptivity, but this reflectivity could be significantly reduced by using an antireflection coating. These results are illustrated in FIG. 6 which shows the reflectivities calculated for a 650-Å-thick cermet film deposited on Ni (dashed line 60).

On the basis of these calculations, a number of composite specimens were prepared by successively depositing a cermet film of 29 vol % Cr and an antireflection coating of $Cr_2O_3$ on various metal substrates. The solar absorptivity $\alpha$ with respect to air mass 2 and the infrared emissivity $\epsilon$ for an absorber temperature of 121° C. were then determined by means of reflectivity measurements made with an integrating sphere. The reflectivity-vs-wavelength curve 61 measured for one of these composites, consisting of a cermet film 650 Å thick and an antireflection $Cr_2O_3$ film 350 Å thick on a Ni-coated stainless-steel substrate, is shown in FIG. 6. The reflectivity is low in the visible spectrum but beginning at about 1.5 μm it rises rather steeply to high values, as required for low infrared emissivity. This composite has excellent selective black properties, with $\alpha$ of about 0.92 and $\epsilon$ of about 0.08. Comparable optical properties were also obtained for cermet films deposited on copper, aluminum, and uncoated stainless steel.

To investigate the stability of the $Cr_2O_3$/Cr-substrate composites, spectral reflectivity measurements were repeated on a number of samples after they had been heated in ambient air for several days at various temperatures. Comparison with results for an as-grown sample deposited in the same sputtering run show that the optical properties were essentially unaffected by heating the sample to 300° C. for 64 h. The composites involving metals other than Ni-coated steel were less stable, exhibiting significant degradation after heating to 300° C. in the air and are limited to temperatures of about 200° C.

Figure 6:
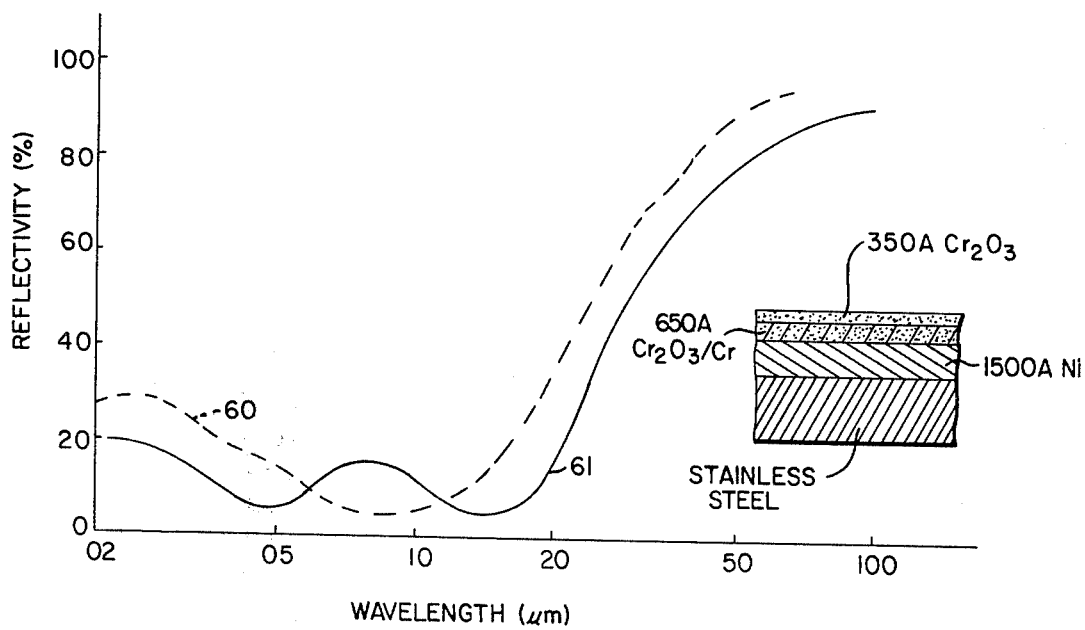
FIG. 6 shows the reflectivity as a function of wavelength of a preferred composition of $Cr_2O_3$/Cr cermet film and a cross-sectional view of the film on a metallic substrate.

While the selective absorptivity of only a specific thickness and composition of $Cr_2O_3$/Cr film has been shown in FIG. 6, it is apparent from the absorption coefficient plots of FIG. 5 that as for the MgO/Au and MgO/Pt films, there is a range of compositions and thicknesses of films which will function satisfactorily if not optimally and it is intended that this invention include such films.

Excellent and stable solar selective black absorbers can be obtained by coating MgO/Au, MgO/Pt, and $Cr_2O_3$/Cr cermet films on substrates that have low infrared emissivity. Metallic substrates belong to a subgroup of such substrates. In some instances, however, it may be desirable to use substrates that have the metallic base overcoated with a thin electrically insulating layer that is transparent to the infrared radiation. (Such composite substrates also have low infrared emissivity, but are not electrically conducting in the direction normal to the substrate.) The insulating layer should also have thermal expansion coefficient compatible with the cermet film to be deposited on it (such as the insulating component of the cermet film), and form a diffusion barrier between the cermet film and the metallic base and enable the absorbers to survive higher temperatures. In other words, a requirement of the substrate is that the substrate must have low infrared emissivity, and those skilled in the art are capable of fabricating many such substrate combinations. Finally, the preparation of cermet films by vacuum deposition such as sputtering allows one to prepare selective absorbers on a larger variety of substrates, instead of requiring electrical conductivity of the medium upon which the film is deposited as does the electrodeposited Cr black.

In some cases, the metallic component of the cermet films could interact with the metallic substrate and render the absorber unstable. A proper choice of the insulating layer between the cermet and the metallic substrate will stop the interaction between such metals. Typically, an insulating layer 5–10 μm thick is satisfactory to prevent interdiffusion without substantially reducing the infrared transparency of the insulating layer. The insulator is also chosen to have a thermal expansion coefficient compatible with the cermet and the metal base to alleviate the problem of the differences in the thermal expansion. Typical insulators are MgO, $Cr_2O_3$, $TiO_2$, $MgF_2$, and $BeF_2$. Other insulating materials may be used which are stable at the temperature at which cermets are to be operated and which are substantially transparent to infrared in the layer thickness which must be used to prevent the diffusion into each other of the metal of the cermet and the metal of the substrate base.

Figure 7:
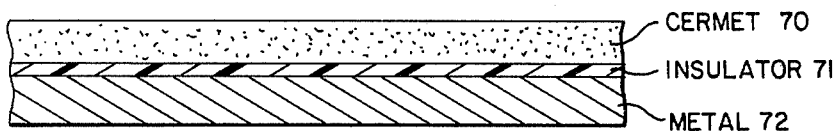
FIGS. 7-9 show cross-sectional views of selective-black absorbers.
Figure 8:
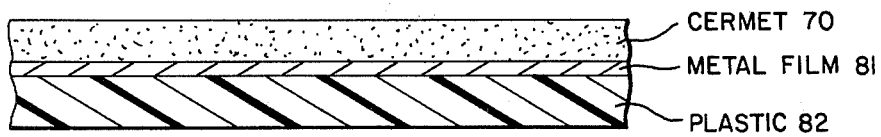
Figure 9:
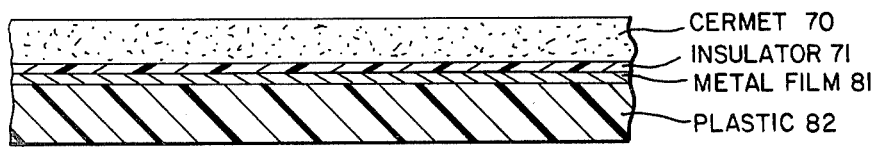

FIG. 7 shows a cross-sectional view of a selective black absorber where the cermet film 70 is deposited on an insulator 71, which is on a metal base 72. FIG. 8 shows a cross-sectional view of another absorber where the construction is suitable for use with cermets in which diffusion is not a problem. Here the cermet 70 is sputtered onto a metal film 81 coated on insulator 82, typically, a plastic or glass such as aluminized mylar or copper-coated mylar. In such cases, the metallic film is usually 1 μm thick. In this case, the insulator 82 does not have to be transparent in the infrared. However, it should still be stable at the operating temperature. This structure, when plastic is used, could be flexible. Another embodiment of a selective black absorber is shown in cross section in FIG. 9 where an insulator 71 is placed on the metal base 81 of the insulator 82 before sputtering on the cermet 70 and the metal film 81 of the substrate is a problem which must be overcome. Incidentally, the composite substrates shown in FIGS. 7, 8, and 9 are not electrically conductive normal to the substrate.

CONCLUSION

These results indicate that MgO/Au, MgO/Pt and $Cr_2O_3$/Cr films on various different substrates are stable in air at elevated temperatures. All the MgO cermet films, except the one deposited on Ni coated Copper substrates which degraded after 5 hours in air at 400° C., remained stable in physical and optical properties up to at least the temperatures tested. The $Cr_2O_3$/Cr film composites are stable to lower temperatures but are nonetheless useful as selective-black absorber.

Hence, MgO/Au, MgO/Pt and $Cr_2O_3$/Cr cermet films are an excellent selective-black material system with good mechanical and chemical stability for application to solar energy collection. The requirements of such a selective absorber are satisfied by a cermet film which consists of metallic particles of a material, and which is chemically stable to elevated temperatures in air, and of particles of a dielectric material, which is also stable to elevated temperatures in air. The metallic particles and dielectric particles should also grow in individual grains of appropriate sizes for high absorption in the solar spectrum, and low absorption in the infrared spectrum. These requirements are satisfied by this invention.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and sprirt of the appended claims.

What is claimed is:

1. A selective black absorber capable of highly absorbing solar energy and only slightly emitting infrared energy comprising:
   a composite substrate comprising a plastic layer and a low infrared emissivity film coating deposited thereon and said composite substrate being electrically nonconductive in the direction normal to the layer of said composite substrate,
   a cermet film deposited on the film coating of said composite substrate, said cermet film comprising metal particles having diameters much less than the average wavelength of solar energy to be absorbed to cause the particles to behave as Lorentz oscillators in the visible light spectrum and thus be good solar energy absorbers,
   said cermet film having a thickness and composition such that it has high solar absorptance and low infrared thermal emissivity as a coating on said substrate having low infrared emissivity.

2. The absorber of claim 1 wherein said plastic layer is flexible.

3. The absorber of claim 1 wherein said substrate coating is a metal film.

4. The absorber of claim 3 wherein said cermet film is MgO/Au.

5. The absorber of claim 3 wherein said cermet film is MgO/Pt.

6. The absorber of claim 2 wherein said metal is Cu.

7. The absorber of claim 3 wherein said metal is aluminum.

8. The absorber of claim 3 where said composite substrate comprises in addition an infrared transparent electrical insulator on said metal coating on which insulator said cermet film is deposited.

9. The absorber of claim 8 wherein said insulator is an oxide.

10. The absorber of claim 8 wherein said oxide is the oxide of the cermet.

11. The absorber of claim 1 wherein said cermet is MgO/Au.

12. The absorber of claim 1 wherein said cermet film is $Cr_2O_3/Cr$.

13. The absorber of claim 12 wherein said substrate coating is a metal.

14. The absorber of claim 12 wherein said $Cr_2O_3/Cr$ cermet film has a solar spectrum anti-reflection $Cr_2O_3$ oxide film on its surface.

15. The absorber of claim 1 wherein said composite substrate is an infrared transparent insulator on a metallic film on a plastic base.

16. The absorber of claim 15 wherein said transparent insulator is an oxide.

17. The absorber of claim 16 wherein said oxide is the oxide of the cermet.

18. The absorber of claim 1 wherein
   said coating is a metallic film of sufficient thickness to provide low infrared emissivity.

19. The absorber of claim 1 wherein
   said metallic film is of the order of one $\mu$m thickness.

20. The absorber of claim 1 wherein
   said cermet is substantially 1500 Å thick.

21. The absorber of claim 1 wherein
   said cermet metal particles are less than 200 Å in diameter.

22. The absorber of claim 1 wherein
   said cermet is substantially 75 vol. %MgO, 25 vol. % Au,
   the thickness of said cermet is substantially 1600 Å,
   and the diameters of said MgO and Au cermet particles of said MgO/Au cermet are less than 200 Å.

23. A selective black absorber capable of highly absorbing solar energy and only slightly emitting infrared energy comprising:
   a metallic substrate having low infrared emissivity,
   an electrically insulating layer which is transparent to infrared radiation deposited on said metallic substrate to form a metallic substrate-insulating layer composite which is electrically insulating in the direction normal to the substrate,
   a cermet film deposited on the electrically insulating layer, said cermet film comprising metal particles having low emissivity in the infrared spectrum and diameters much less than the average wavelength of solar energy to be absorbed to cause the particles to behave as Lorenz oscillators and to be good solar energy absorbers, said cermet film having a thickness and composition such that it has high solar absorptance and low infrared thermal emissivity.

24. The absorber of claim 23 wherein said electrically insulating layer is selected from the group consisting of MgO, $Cr_2O_3$, $TiO_2$, $MgF_2$, and $BeF_2$.

* * * * *